United States Patent [19]

McCollum et al.

[11] Patent Number: 4,857,620

[45] Date of Patent: Aug. 15, 1989

[54] FLUORINE CONTAINING POLYMERS AND COATING COMPOSITIONS PREPARED THEREFROM

[75] Inventors: Gregory J. McCollum, Gibsonia; Jason L. Chou, Wexford; James R. Bodwell; Suryya K. Das, both of Allison Park, all of Pa.

[73] Assignee: PPG Industries, Inc., Pittsburgh, Pa.

[21] Appl. No.: 213,049

[22] Filed: Jun. 29, 1988

[51] Int. Cl.$^4$ .............................................. C08F 14/18
[52] U.S. Cl. ................................... 526/255; 526/254; 526/249; 526/250
[58] Field of Search ............... 526/250, 245, 255, 249, 526/254, 250

[56] References Cited

U.S. PATENT DOCUMENTS

| 1,816,843 | 8/1931 | Halbig et al. | |
| 3,480,603 | 11/1969 | Selman et al. | 260/87.5 |
| 3,502,732 | 3/1970 | Selman et al. | 260/615 |

FOREIGN PATENT DOCUMENTS

| 0138091 | 4/1985 | European Pat. Off. | |
| 519443 | 2/1931 | Fed. Rep. of Germany | |

OTHER PUBLICATIONS

Bailey et al., "Free Radical Ring-Opening Polymerization and its Use to Make Biodegradable Polymers and Functionally Terminated Oligomers", *Makromol. Chem., Symp.* 6, 81 (1986).

"Preparation of Poly(Ortho Esters) by the Reaction of Diketene Acetals and Polyols", Journal of Polymer Science: Polymer Letters Edition, vol. 18, 619–624 (1980), copyright 1980 by John Wiley & Sons, Inc.

Dunn and Plesch, "The Cationic Polymerization of Ketene Acetals and the Preparation and Characterization of Poly (1,3-diketones)", *Die Makromolekulare Chemie*, 175, 2821–2836 (1974).

Bailey et al., "Synthesis of Poly-e-Caprolactone via a Free Radical Mechanism, Free Radical Ring-Opening Polymerization of 2-Methylene-1,3-Dioxepane", Journal of Polymer Science: Polymer Chemistry Edition, vol. 20, 3021–3030 (1982) copyright 1982 by John Wiley & Sons, Inc.

"Photoinitiated Ring-Opening Polymerizatin of 2-Methylene-1,3-Dioxepane", Journal of Polymer Science: Polymer Letters Edition, vol. 21, 373–380 (1983) copyright 1983 by John Wiley & Sons, Inc.

Endo, Fukada, Hirota, "Reaction of Cyclic Ketene Acetal and Carbon Disulfide Through Macrozwitterion", Journal of The American Chemical Society, 1984, 106 4035–4036.

Bailey et al., "Synthesis of Functionally-Terminated Oligomers by Free Radical Ring-Opening Polymerization", J. Macromol. Sci. Chem. Azi (8 & 9), 979–995 (1984) copyright 1984 by Marcel Dekker, Inc.

Bailey et al., "Free Radical Ring-Opening Polymerization of 4,7-Dimethyl-2-methylene-1,3-dioxepene and 5,6-Benzo-2-methylene-1,3-dioxepane", *Macromolecules*, 15, 711 (1982).

Bailey, Gapud, "Synthesis of Biodegradable Polyethylene", *Am. Chem. Soc. Div. Polymer Chem., Preprints*, 25(1) 58 (1984).

Bailey et al., "The Use of Free Radical Ring-Opening Polymerization for the Synthesis of Reactive Oligomers", *Am. Chem. Soc., Div. Polymer Chem., Preprints*, 25(1), 142 (1984).

Bailey, "Free Radical Ring-Opening Polymerization", *Am. Chem. Soc., Div. Polymer Chem., Preprints*, 25(1), 210 (1984).

Primary Examiner—Joseph L. Schofer
Assistant Examiner—N. Sarofim
Attorney, Agent, or Firm—Linda Pingitore

[57] ABSTRACT

A fluorine containing polymer containing ester groups in the backbone of the polymer is prepared by the ring opening free radical polymerization of a cyclic ketene acetal with a vinyl monomer component comprising a fluorine containing vinyl monomer. The aforesaid fluorine containing polymer which contains ester groups can be reacted with a material containing functional groups capable of cleaving the carbon oxygen single bonds of the ester groups. The resultant oligomeric material contains functionality as a result of the cleavage which is suitable for reaction with a crosslinking agent to form a cured film.

9 Claims, No Drawings

FLUORINE CONTAINING POLYMERS AND COATING COMPOSITIONS PREPARED THEREFROM

CROSS REFERENCE TO RELATED APPLICATIONS

This application is related to Ser. No. 213,048, entitled "Fluorine Containing Polymer Having A Terminal Ester Group", and Ser. No. 212,994, entitled "Process For Preparing Ketene Acetals", filed even date herewith.

BACKGROUND OF THE INVENTION

The present invention relates to polymers containing fluorine groups and also to coating compositions prepared from these polymers.

It is desirable in a variety of applications such as building products to prepare coating compositions from film forming binders based on fluoropolymers because these materials tend to be very durable. Not only do coating compositions based on fluorocarbon resins provide a tough finish, but they also provide a finish that will not craze or chalk upon extended outdoor exposure. As a result, such coating compositions are highly recommended for use in environments with agressive climatic conditions. As was mentioned above, these coatings are especially suited for the building products industry, particularly in the preparation of steel building panels.

Especially suited for these applications where durability is important are the fluoroolefin polymers wherein the fluorine content of the polymer is high. Such polymers can be derived from the common fluoroolefin monomers such as vinyl fluoride, vinylidene fluoride, tetrafluoroethylene, perfluorohexylethylene and chlorotrifluoroethylene. The preparation of fluoroolefin polymers, however, is not without difficulty. While the aforesaid fluorine containing vinyl monomers can be polymerized with nonfluorine-containing vinyl monomers, the variety of polymeric structures is limited due to the unusual reactivity parameters of fluorine containing vinyl monomers. In addition to the difficulties attendant to the preparation, once the polymerization is complete, the resultant polymers are difficult to formulate into high solids compositions because of their poor solubility and other physical properties such as molecular weight, functionality, etc. Even when the preparation can be done readily other problems arise. For example, it is known to polymerize fluoroolefin monomers with vinyl ethers or vinyl acetate in order to improve solubility and introduce curable functionality into the fluoroolefin polymer. This technique, however, often results in a polymer in which the fluorine units are distributed in an alternating fashion, therefore a polymer with a high fluorine content is not readily obtained.

There is a need, therefore, for fluorine containing vinyl polymers which contain a high fluorine content, are relatively easy to prepare from inexpensive starting materials, and which can be readily formulated into thermosetting coating compositions.

SUMMARY OF THE INVENTION

In accordance with the present invention there is provided a fluorine containing polymer containing ester groups in the backbone of the polymer which is prepared by the ring opening free radical polymerization of a cyclic ketene acetal with a vinyl monomer component comprising a fluorine containing vinyl monomer.

Also provided in accordance with the present invention is a reaction product of components comprising:

(a) a fluorine containing polymer containing ester groups in the backbone of the polymer which is prepared by the ring opening free radical polymerization of a cyclic ketene acetal with a vinyl monomer component comprising a fluorine containing vinyl monomer; and (b) a material adapted to cleave carbon-oxygen single bonds present in the ester groups of the fluorine containing polymer of (a).

Also provided is a coating composition comprising as a film former the product described above and a crosslinking agent adapted to react with functionality present on the film former as a result of cleavage of the ester groups.

DETAILED DESCRIPTION OF THE INVENTION

The fluorine containing polymer of the present invention is prepared by the ring opening free radical polymerization of a cyclic ketene acetal with a vinyl monomer component comprising a fluorine containing vinyl monomer. The cyclic ketene acetal can be represented most simply by the structural formula set out below:

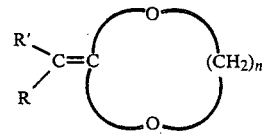

wherein:

n is an integer of at least 2, preferably from 2 to 4;

$R'$ and $R$ are independently selected from hydrogen, lower alkyl, halogen or lower alkoxy.

The carbon chain length for the alkyl and alkoxy substituents should be adapted to facilitate the ring opening polymerization reaction. This is preferably accomplished with relatively short chain, linear substituents. The alkyl substituent is preferably a $C_1$–$C_4$, linear alkyl chain. The alkoxy substituent can be represented by the group $OR''$, wherein $R''$ is a $C_1$–$C_4$, linear alkyl chain. If the substituent groups present on the cyclic ketene acetal are too bulky, they can interfere with the ring opening polymerization reaction. The halogen substituent can be bromine, chlorine, fluorine or iodine.

It should be understood that the longer carbon chain connecting the two ether oxygens of the cyclic ketene acetal can be also substituted with a variety of substituent groups such as lower alkyl or aryl. The use of this type of cyclic ketene acetal is contemplated to be within the scope of the present invention. Examples of these substituted materials include 4,7-dimethyl-2-methylene-1,3-dioxepane and 5,6-benzo-2-methylene-1,3-dioxepane.

In addition to the substituted materials mentioned above, examples of other suitable cyclic ketene acetals include 2-methylene-1,3-dioxepane, 2-methylene-1,3-dioxolane, 2-methylene-1,3-dioxane and 2-fluoromethylene-1,3-dioxepane. Mixtures can also be utilized. Preferably the cyclic ketene acetal is 2-methylene-1,3-dioxepane.

It should be understood that the term "cyclic ketene acetal" also includes bicyclic bis ketene acetals such as, for example, 3,9-dimethylene-1,5,7,11-tetraoxyspiro[5.5]undecane.

The vinyl monomer component comprises a fluorine containing vinyl monomer. Examples of suitable fluorine containing vinyl monomers include 1,1-difluoroethylene; 1,2-difluoroethylene; chlorotrifluoroethylene; tetrafluoroethylene; vinyl fluoride and perfluorohexylethylene. One preferred fluorine containing vinyl monomer is 1,1-difluoroethylene. The vinyl monomer component can comprise other polymerizable vinyl monomers in addition to the fluorine containing vinyl monomer. Examples of suitable vinyl monomers include butyl vinyl ether, hydroxybutyl vinyl ether, ethyl vinyl ether, vinyl acetate, vinyl chloride, ethylene, styrene, para-methylstyrene, alpha-methylstyrene, methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, 2-ethylhexyl methacrylate, isobornyl methacrylate, 2-hydroxyethyl acrylate, 2-hydroxyethyl methacrylate, acrylamide, vinyl triethoxysilane and a number of N-methylol-acrylamides such as the reaction product of acrylamide with formaldehyde. Generally, the vinyl monomer component comprises from about 10 percent by weight to about 100 percent by weight of the fluorine containing vinyl monomer, preferably at least 40 percent by weight with the balance being made up of other nonfluorine-containing vinyl monomers such as those listed above.

The fluorine containing polymer of the present invention contains ester groups in the backbone. Preferably the ester groups are distributed in the backbone in a substantially random manner. By "substantially random" is meant that the predominant number of ester groups in the backbone are randomly distributed; however, there may be present in small amounts sections of polymer which contain alternating residues of ketene acetal and vinyl monomer. The ester groups in the fluorine containing polymer can be in the central portion of the chain and/or at the ends.

The ring opening polymerization of cyclic ketene acetal with vinyl monomer component comprising fluorine containing vinyl monomer is carried out under conditions conventionally used for polymerization of the fluorinated vinyl monomers alone. The polymerization is typically conducted under pressure in the presence of a solvent and a free radical initiator at a temperature sufficient to generate radicals from the initiator and ring open the cyclic ketene acetal monomer. Typically, the pressure ranges from about 14 psi to about 1400 psi (1 atm to 100 atms). The temperature range is dependent on the initiator/monomer combination. Typically, for di-tert butyl peroxide, the temperature is from about 120° C. to 140° C.

The initiator which is utilized to carry out the ring opening polymerization is usually present in an amount ranging from about 1 percent to about 10 percent, the percentage based on the total weight of the vinyl monomer component. As was mentioned above, generally a solvent is present during the ring opening polymerization. The solvent assists in maintaining the solubility of the polymer as it forms and forms a medium for the reaction. Examples of these solvents include ethyl acetate, butyl acetate and methyl ethyl ketone. Preferably ethyl acetate is used.

The molecular weight of the fluorine containing polymer of the present invention can vary widely. Typically, solution polymers have a number average molecular weight of from about 1,000 to about 10,000 determined by gel permeation chromatography using a polystyrene standard. If desired, higher molecular weights can also be obtained.

The fluorine containing polymers containing ester groups in the backbone of the polymer which have been described in detail above can be utilized to prepare functionally terminated oligomers which are suitable for a variety of applications such as the preparation of thermosetting coating compositions. The functionally terminated oligomer is prepared as a product of components comprising (a) a fluorine containing polymer containing ester groups in the backbone of the polymer which is prepared by the ring opening free radical polymerization of a cyclic ketene acetal as has been described in detail above in the specification and (b) a material adapted to cleave carbon-oxygen single bonds present in the ester groups of the aforesaid fluorine containing polymer. At the point where an ester group is cleaved, the oligomeric portion of polymer remaining will have functional groups which correspond to the functional groups of the particular material which is utilized to cleave the bond. The material adapted to cleave the carbon-oxygen single bonds of the ester groups contains one or more functional groups selected from hydroxyl, amino, carboxyl and thiol. In addition, water is quite useful as this material. As a result of the ester groups being cleaved in a transesterification reaction, a functionally terminated oligomer is formed. In the case of a hydroxyl functional material, the cleaving reaction is an alcoholysis; in the case of an amino functional material, the cleaving reaction is an aminolysis; for a carboxyl containing material the reaction is an acidolysis; for a thiol containing material the reaction is a thiolysis and when water is utilized, the reaction is a hydrolysis reaction.

In the simplest alcoholysis, the fluorine containing polymer containing ester groups in the backbone is treated with a monoalcohol, for example, ethylene glycol monobutyl ether, and a transesterification catalyst, e.g., dibutyltin oxide, to form a lower molecular weight fluorinated hydroxyl terminated monoester.

For the purpose of obtaining a curable alcoholysis product, the fluorine containing polymer containing ester groups can be transesterified with a polyol such as 1,4-butanediol or trimethylolpropane to produce a new lower molecular weight polyester with two or more hydroxyl groups.

For aminolysis a primary amine such as monoethanolamine can be used to cleave, for acidolysis a carboxylic acid such as adipic acid can be used and for thiolysis a mercaptan such as lauryl mercaptan is suitable to cleave the ester groups. Hydrolysis, of course, utilizes water and produces lower molecular weight fluorinated hydroxy acids as the product.

As has been discussed in detail above, the amount and type of functionality which is present on the functional oligomer depends upon the reagent which is used to cleave the ester groups. The functionally terminated oligomer, therefore, can be prepared as a mono-, di-, or polyfunctional material depending upon the desired end use.

The functional oligomers which have been described in detail above are quite suitable in a variety of applications such as film forming polymers for coating compositions and inks and also as additives for a variety of applications.

A coating composition according to the present invention comprises a functional oligomer which has been described in detail above as the film former and a crosslinking agent adapted to react with functionality present on the oligomer as a result of cleavage of the ester groups. Suitable crosslinking agents include aminoplast resins and polyisocyanates include blocked isocyanates.

Aminoplast resins are obtained from the reaction of formaldehyde with an amine or an amide. The most common amines or amides are melamine, urea or benzoguanamine, and are preferred. However, condensates with other amines and amides can be employed, for example, aldehyde condensates of triazines, triazoles, guanidines, guanamines and alkyl and aryl di-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-triethyltriamine-1,3,5-triazine and the like.

While the aldehyde employed is most often formaldehyde, other aldehydes such as acetaldehyde, crotonaldehyde, benzaldehyde and furfural may be used.

The aminoplast contains methylol or similar alkylol groups and preferably at least a portion of these alkyl groups are etherified by reaction with an alcohol to provide organic solvent-soluble resins. Any monohydric alcohol can be employed for this purpose including such alcohols as methanol, ethanol, butanol and hexanol.

Preferably, the aminoplasts which are used are melamine, urea- or benzoguanamine-formaldehyde condensates etherified with an alcohol containing 1 to 4 carbon atoms such as methanol, ethanol, butanol or mixtures thereof.

Polyisocyanates and blocked polyisocyanates can also be used as crosslinking agents. Examples of suitable polyisocyanates include monomeric polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester or polyether polyols. Particularly useful isocyanates are the isocyanurate from isophorone diisocyanate commercially available from Veba Company as T1890 and the biuret from 1,6-hexamethylene diisocyanate commercially available from Bayer as DESMODUR N. The polyisocyanate may optionally be blocked. Examples of suitable blocking agents are those materials which would unblock at elevated temperatures such as low aliphatic alcohols such as methanol, oximes such as methyl ethyl ketoxime, and lactams such as caprolactam. Blocked isocyanates can be used to form stable one-package systems. Polyfunctional isocyanates with free isocyanate groups can be used to form two-package room temperature curable systems. In these systems, the film former and isocyanate curing agent are in separate packages which are mixed just prior to application. The other ingredients of the coating composition can be placed in either package, the particular package chosen depending on the specific materials utilized.

The claimed coating compositions can contain in addition to the film former and crosslinking agent a variety of other optional materials. For example, the aminoplast crosslinking agents are typically utilized in association with an acid catalyst such as paratoluene sulfonic acid in order to assist in accelerating the rate of cure and/or lowering the particular temperature utilized for cure. The polyisocyanate crosslinking agents are also typically utilized in association with a catalyst which will lower the cure temperature and/or reduce the length of time for cure. Typical catalysts utilized are organotin compounds such as dibutyltin dilaurate and amines. The coating compositions of the present invention usually also contain pigment, although a clear coating composition can be prepared if desired, and a liquid diluent for the resinous binder. In addition, if desired, other resinous materials can be utilized in conjunction with the primary film forming binder so long as they do not detrimentally effect the resultant coating composition.

A liquid diluent is generally an organic solvent or a non-solvent which is volatile, is removed after the coating is applied, and is utilized to reduce viscosity sufficiently to enable application. Also, diluents assist in substrate wetting and coalescence or film formation. Generally, a diluent is present in the composition in an amount of from about 10 percent to about 80 percent, based on the total weight of the ingredients of the coating composition. Examples of suitable liquid diluents include aromatic hydrocarbons such as toluene and xylene, ketones such as methyl ethyl ketone and methyl isobutyl ketone, alcohols such as isopropyl alcohol, monoethyl ethers of glycols and mixtures thereof. In addition, the coating composition can contain solvents which have been introduced in the process for preparing the functional oligomer which is utilized as the film former as has been described above.

A variety of pigments can be utilized if desired, for example, carbon black, titanium dioxide, talc, a variety of color pigments and also metallic pigments such as aluminum flake. The coating compositions of the present invention can be applied in a variety of conventional ways including brushing, dipping, spraying, flow coating and electrodeposition. The compositions can be applied over a variety of substrates.

The coating compositions of the present invention can be cured by baking at elevated temperature from about 60° C. to about 400° C. for a period ranging from about 10 minutes to about 60 minutes.

The fluorooligomers of the present invention are particularly advantageous because they are low molecular weight polyfunctional materials which can be utilized with crosslinking agents to form high solids thermosetting compositions. The coating compositions are advantageous in that they have good durability from the fluoropolymer and require less solvent for application.

The following examples are illustrative of the invention and are not intended to be limiting.

EXAMPLE I

This example illustrates the preparation of a copolymer of vinylidene fluoride and 2-methylene-1,3-dioxepane.

| Charge | Ingredients | Parts by Weight (grams) |
|---|---|---|
| A | ethyl acetate solvent | 550 |
|   | 2-methylene-1,3-dioxepane | 65 |
| B | vinylidene fluoride | 585 |
| C | di-t-butyl peroxide | 18.2 |
|   | ethyl acetate | 81.8 |

A steel reactor was charged with monomer solution (A), monomer (B), and 10 g of catalyst solution (C) at once. The reactor was sealed and heated to 135° C. After 1 hour, the remaining 90 g of catalyst solution (C) was charged continuously into the reactor over a period of 3 hours. The reaction was held at 135° C. until a final total solids content of 50 percent was achieved. After evaporation of ethyl acetate under vacuum, the obtained white powder copolymer was dried in a vacuum oven for 10 hours.

EXAMPLE II

This example illustrates the preparation of a hydroxyl function oligomer prepared by transesterification of the copolymer described above in Example I with 1,4-butanediol.

| Ingredients | Parts by Weight (grams) |
| --- | --- |
| copolymer of vinylidene fluoride and 2-methylene-1,3-dioxepane of Example I | 100 |
| butyl stannoic acid | 2 |
| 1,4-butanediol | 1,000 |

A two liter round bottom flask was charged with the above ingredients at once and heated to 160° C. with nitrogen sparge. The reaction was held at 160° C. for 22 hours, and at that stage the solution became clear and there was no further change in total solids content. When the excess of 1,4-butanediol had been removed by evaporation, the light yellow product was dried in a vacuum oven at 120° C. for 12 hours.

EXAMPLE III

In this example an oligomer was prepared similar to that of Example II above with the exception that 2 g of butyl tin oxide was used as the catalyst instead of 2 g of butyl stannoic acid.

EXAMPLE IV

This example illustrates the preparation of a coating composition utilizing the dihydroxy oligomer of Example II, above and a melamine formaldehyde crosslinking agent.

| Ingredients | Parts by Weight (grams) |
| --- | --- |
| CYMEL 303[1] | 1.67 |
| dihydroxy oligomer[2] | 6.67 |
| methyl isobutyl ketone | 13.33 |
| dodecylbenzenesulfonic acid (70% solution) | 0.24 |

[1]This is hexamethoxymethylmelamine, commercially available from American Cyanamid.
[2]This dihydroxy oligomer was prepared in Example II, above.

The coating composition was applied on a steel panel using a 5-mil draw-down bar and the panel was baked at 177° C. for 0.5 hour to give a opaque film that resisted acetone rubbing.

In a control test, the copolymer of vinylidene fluoride and 2-methylene-1,3-dioxepane of Example I was mixed with the same amounts of CYMEL 303, dodecylbenzene sulfonic acid, and methyl isobutyl ketone and processed as described above. The result was an uncured opaque film that did not resist acetone rubbing.

EXAMPLE V

This example illustrates the preparation of a coating composition using a different solvent. The coating composition utilizes the dihydroxy oligomer of Example II, melamine formaldehyde crosslinking agent and N-methyl pyrrolidone.

| Ingredients | Parts by Weight (grams) |
| --- | --- |
| CYMEL 303 | 1.67 |
| dihydroxy oligomer[3] | 6.67 |
| N—methyl pyrrolidone | 9.34 |
| dodecylbenzene sulfonic acid (70% solution) | 0.24 |

The above mixture was processed as described in Example IV to give a film with higher gloss than that of Example IV that also resisted acetone rubbing.

In a control test conducted as described in Example IV, the obtained uncured film failed acetone rubbing.

EXAMPLE VI

This example illustrates the preparation of a coating composition using a polyisocyanate curing agent. The coating composition was prepared from the dihydroxy oligomer of Example II with a polyisocyanate in methyl isobutyl ketone.

| Ingredients | Parts by Weight (grams) |
| --- | --- |
| DESMODUR N 100[4] | 0.48 |
| dihydroxy oligomer[5] | 3.00 |
| methyl isobutyl ketone | 7.00 |
| dibutyltin diacetate | 0.03 |

[4]This is a tri-functional aliphatic polyisocyanate commercially available from Bayer.
[5]This dihydroxy oligomer was prepared in Example II.

The above coating composition was applied on a steel panel with a 3 mil draw-down bar. The panel was allowed to stand at room temperature for 0.5 hour and then it was further baked at 177° C. for 0.5 hour to give an opaque film that resisted acetone rubbing. The film pencil hardness was H.

In a control test, the copolymer of vinylidiene fluoride and 2-methylene-1,3-dioxepane of Example I was mixed with the same amount of DESMODUR N 100 and dibutyltin diacetate in methyl isobutyl ketone and processed as described above. The resultant uncured opaque film did not resist acetone rubbing.

EXAMPLE VII

This example illustrates the preparation of a copolymer of perfluorohexylethylene and 2-methylene-1,3-dioxepane.

| Ingredients | Parts by Weight (grams) |
| --- | --- |
| perfluorohexylethylene | 80.0 |
| 2-methylene-1,3-dioxepane | 20.0 |
| t-butyl peroxyoctoate (50% active) | 6.0 |
| butyl acetate | 23.6 |

A round bottom flask was charged with 13 g (10 percent) of the above mixture of ingredients at room temperature and heated to reflux. The remaining 90 percent of the mixture was added dropwise to the flask over a period of 3 hours under reflux. After the reaction was held for an additional 3 hours at the refluxing temperature, the flask was cooled to room temperature. The product had a total solids content of 62 percent.

What is claimed is:

1. A fluorine containing polymer containing ester groups in the backbone of the polymer which is prepared by the ring opening free radical polymerization of a cyclic ketene acetal with a vinyl monomer component comprising a fluorine containing vinyl monomer.

2. The polymer of claim 1 wherein the ester groups are distributed in the backbone of the polymer in a substantially random manner.

3. The polymer of claim 1 wherein there are present in the vinyl monomer component in addition to the fluorine containing vinyl monomer other polymerizable vinyl monomers.

4. The polymer of claim 1 wherein the cyclic ketene acetal is represented by the following structural formula:

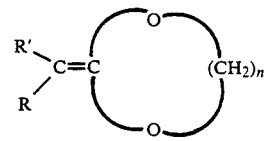

wherein
n is an integer of at least 2;
R' and R are independently selected from hydrogen, lower alkyl, halogen or lower alkoxy.

5. The polymer of claim 4 wherein the cyclic ketene acetal is 2-methylene-1,3-dioxepane.

6. The polymer of claim 1 wherein the fluorine containing vinyl monomer is selected from 1,1-difluoroethylene, 1,2-difluoroethylene, chlorotrifluoroethylene, tetrafluoroethylene, vinyl fluoride and perfluorohexylethylene.

7. The polymer of claim 1 wherein the ring opening free radical polymerization is conducted with a peroxide initiator.

8. The polymer of claim 4 wherein the lower alkyl is a $C_1$ to $C_4$ linear alkyl.

9. The polymer of claim 4 wherein the lower alkoxy group is represented by OR" wherein R" is $C_1$ to $C_4$ linear alkyl.

* * * * *